United States Patent
Lord et al.

(10) Patent No.: US 6,763,012 B1
(45) Date of Patent: Jul. 13, 2004

(54) MOBILE TERMINAL AND METHOD OF PROVIDING A NETWORK-TO-NETWORK CONNECTION

(75) Inventors: Martin Lord, Blainville (CA); Suhail Hasan, Redmond, WA (US); Danny Lung, Lasalle (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 707 days.

(21) Appl. No.: 09/621,129

(22) Filed: Jul. 21, 2000

(51) Int. Cl.[7] .............................................. H04Q 7/24
(52) U.S. Cl. ...................................... 370/338; 370/469
(58) Field of Search ................................ 370/310, 328, 370/310.1, 310.2, 329, 338, 337, 341–9, 351–3, 466, 469

(56) References Cited

U.S. PATENT DOCUMENTS

| | | | |
|---|---|---|---|
| 5,812,531 A | * | 9/1998 | Cheung et al. .............. 370/255 |
| 6,535,918 B1 | * | 3/2003 | Bender et al. .............. 709/228 |
| 6,542,491 B1 | * | 4/2003 | Tari et al. ................... 370/338 |
| 6,578,088 B2 | * | 6/2003 | Ohno et al. ................. 709/245 |

FOREIGN PATENT DOCUMENTS

| | | |
|---|---|---|
| WO | WO 98/24250 | 6/1998 |
| WO | WO 99/16266 | 4/1999 |
| WO | WO 99/33301 | 7/1999 |
| WO | WO 00/18066 | 3/2000 |
| WO | WO 01/86908 | 11/2001 |

OTHER PUBLICATIONS

Perkins, Mobile IP, 1998, Addison–Wesley, pp.: 121–125, 225, 232–233.*
Charles E. Perkins et al.: *Using DHCP with computers that move*, 8452 Wireless Networks, Oct. 1, 1995, No. 3, Amsterdam, NL, pp. 341–353.
International Search report for application PCT/CA01/01040, mailed on Jul. 31, 2002.

* cited by examiner

*Primary Examiner*—David Vincent
(74) *Attorney, Agent, or Firm*—Smith & Danamraj, P.C.

(57) ABSTRACT

A mobile terminal (MT) and a method of connecting a plurality of devices on a computer network to a packet data network (PDN) over a single wireless link. In a first embodiment, the MT requests and receives from the PDN, a network IP address comprising a plurality of unique individual IP addresses. The number of IP addresses may be defined in a subscription agreement. The MT then utilizes a Dynamic Host Configuration Protocol (DHCP) server in the MT to distribute the plurality of unique individual IP addresses to the plurality of devices on the LAN. In a second embodiment, the MT requests a separate PDP Context for each device on the LAN requiring an IP address. The MT utilizes a Point-to-Point Protocol over Ethernet (PPPoE) session between the devices on the LAN and the MT to virtually separate the physical network connection and distribute individual IP addresses to the plurality of devices on the LAN.

13 Claims, 5 Drawing Sheets

MOBILE TERMINAL AND METHOD OF PROVIDING A NETWORK-TO-NETWORK CONNECTION

BACKGROUND OF THE INVENTION

1. Technical Field of the Invention

This invention relates to telecommunication systems and, more particularly, to a mobile terminal and a method of connecting a computer network to a packet data network (PDN) over a single wireless link.

2. Description of Related Art

In the General Packet Radio Service (GPRS) network architecture, the "Mobile Terminal" (MT) is the radio device handling the GPRS air interface. The "Terminal Equipment" (TE) is the user equipment connected to the MT, and the "Mobile Station" (MS) designates both TE and MT together. In the Universal Mobile Telephony System (UMTS) architecture, the term "User Equipment" (UE) is equivalent to the GPRS MS.

In GPRS, the use of the Point-to-Point Protocol (PPP) to connect a single TE such as a laptop computer to an MT for the provision of wireless packet and Internet access has been well-documented in the UMTS standards UMTS 23.060 and UMTS 27.060. The PPP protocol uses two protocols, the Link Control Protocol (LCP) and the Network Control Protocol (NCP) to first establish the link between the TE and the MT, and then to provide a dynamic IP address to the TE. The way the technology and the standards are defined, however, they enable only one IP device to be connected through one cellular link.

In the current cellular packet data network technologies, such as GPRS/GSM (Global System for Mobile Communications), GPRS/EDGE (Enhanced Data Rates for GPRS Evolution), and UMTS, the network side can only associate a single host with each radio link between the Base Station System (BSS) and an MT. If more than one host is connected to the MT, the network is not able to handle this with only one packet data address association.

In the future, a user may carry a plurality of devices (for example, a Personal Digital Assistant (PDA), a laptop computer, a mobile telephone, etc.) that are capable of communicating with each other over a wired or wireless network. These devices may be connected to each other over a small Local Area Network (LAN) or a wireless LAN utilizing technologies such as Bluetooth, for example. It would be desirable to provide two-way connectivity to PDNs such as the Internet for all of the devices connected to the user's LAN.

GPRS allows the MT to open up several Packet Data Protocol (PDP) Contexts at the same time. In the GPRS architecture, the MT is connected to one or more TEs through the defined "R" interface. However, each opened PDP Context requires a separate PPP stack in the MT in a one-to-one ratio, since PPP requires two unique endpoints for each opened session. Thus, a subscriber with a PDA and a laptop essentially requires two cellular links (and possibly two cellular subscriptions) to simultaneously connect both of the devices to the Internet.

With the advent of ad hoc networking, and with the important increase in bandwidth of the cellular PDNs based on EDGE and UMTS, it is expected that the capability to connect a network of computers through a single cellular link will become more critical. This is not possible today because the network assigns only one packet data address to the MS, and it is impossible for the PDN to associate with a TE if the TE does not have a unique address. When multiple TEs try to connect to the network through the use of only one MT, there is an insufficient number of address associations. The existing cellular packet data technologies allow associating many packet data addresses with the same host, but that is of no help in solving the problem here. No direct method based on ISO layer 2 and 3 technology can be used to solve this problem. In addition, there are no existing cellular protocols or IP protocols that can be used to solve the problem.

In order to overcome the disadvantage of existing solutions, it would be advantageous to have a mobile terminal and a method of connecting a plurality of devices with a plurality of IP addresses through the mobile terminal, and a single wireless link, to a packet data network (PDN) such as the Internet. The present invention provides such a mobile terminal and method.

SUMMARY OF THE INVENTION

In one aspect, the present invention is a method of connecting a plurality of devices, each having a unique IP address, through a single MT and a single wireless link to a PDN. The plurality of devices are connected to the MT on a network such as a LAN. In a first embodiment, the MT then requests and receives from the PDN, a network IP address comprising a plurality of unique individual IP addresses. The MT then utilizes, for example, a Dynamic Host Configuration Protocol (DHCP) server in the MT to distribute the plurality of unique individual IP addresses to the plurality of devices on the LAN.

In a second embodiment, rather than requesting a network IP address, the MT requests a separate PDP Context for each device on the LAN, and utilizes a PPP over Ethernet (PPPoE) session between the devices on the LAN and the MT to virtually separate the physical network connection into a plurality of unique individual IP addresses assignable to the plurality of devices on the LAN.

In yet another aspect, the present invention is an MT for connecting a plurality of devices, each having a unique IP address, through a single wireless link to a PDN. In a first embodiment, the MT includes (1) a Point-to-Point Protocol (PPP) stack for connecting the MT to the plurality of devices over a LAN; (2) means for receiving from the PDN a network IP address comprising a plurality of unique individual IP addresses; and (3) a DHCP server for distributing the plurality of unique individual IP addresses to the plurality of devices on the LAN.

In a second embodiment of the MT, the MT includes (1) means for requesting from the PDN, a separate packet data protocol (PDP) Context for each device on the LAN; and (2) a Point-to-Point Protocol over Ethernet (PPPoE) stack. The PPPoE stack connects the MT to the plurality of devices on the LAN, receives an indication from each individual device on the LAN whether the device requires an IP address, and distributes IP addresses to the plurality of devices on the LAN.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a method of connecting a plurality of devices with a plurality of IP addresses through a single mobile terminal (MT) and a single wireless link to a packet data network (PDN) such as the Internet. The method includes all the required procedures to connect several hosts or devices in the LAN environment to a single GPRS/UMTS MT, with each host or device having its own IP address. Each of these hosts or devices may then use this single MT to send and receive data to/from the Internet or private PDNs. Two embodiments are identified and described below. Both embodiments are designed for use with a wireless link, and do not add significant overhead to messages sent over the air interface.

Figure 1:
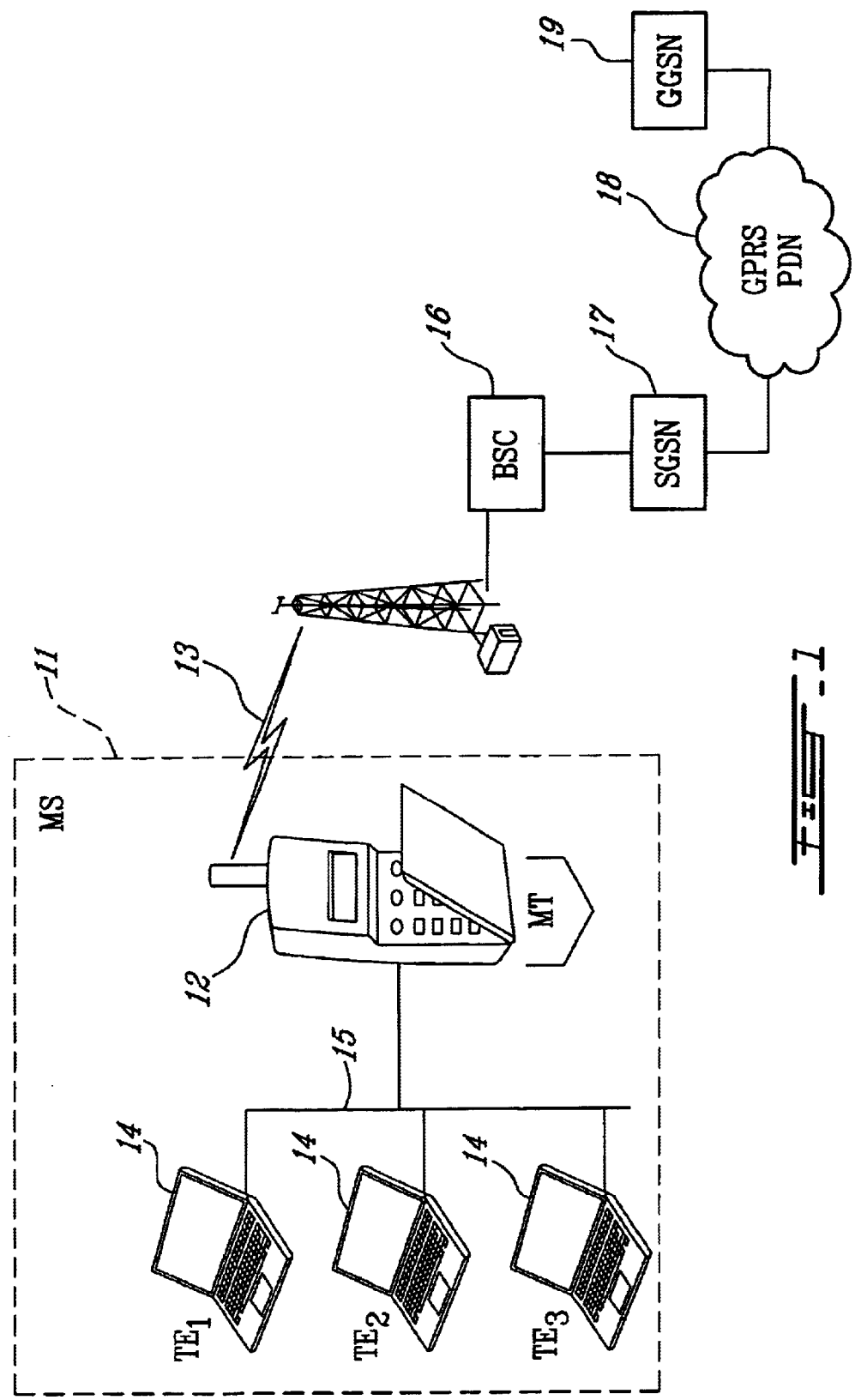
FIG 1 is a simplified block diagram of a network architecture suitable for implementing the method of the present invention.

FIG. 1 is a simplified block diagram of a network architecture suitable for implementing the method of the present invention. The exemplary architecture illustrated in FIG. 1 is for a GPRS network, although, in the first embodiment, the invention may be utilized with any type of wireless PDN. In the GPRS network architecture, a Mobile Station (MS) 11 includes a Mobile Terminal (MT) 12 which handles the GPRS air interface 13, and a plurality of Terminal Equipment (TEs) 14 which are connected through a wired or wireless LAN 15 to the MT. On the PDN side of the air interface is a Base Station Controller (BSC) 16, a Serving GPRS Support Node (SGSN) 17, the GPRS PDN 18, and a Gateway GPRS Support Node (GGSN) 19 which may be used to connect to other networks.

In order to connect several TEs in the LAN environment to a single GPRS/UMTS MT, with each TE device having its own IP address, the MT 12 implements the normal GPRS/UMTS protocols for connection to the PDN 18, and uses any layer 2 LAN interface (for example Ethernet, 802.11) for connection to the LAN 15. In one embodiment, the MT provides a Dynamic Host Configuration Protocol (DHCP) server on the LAN interface to provide dynamic host configuration for all the TE hosts and devices connected to this interface. The MT on this interface also acts as a router or default gateway for hosts and devices visiting the network. The MT implements a mapping between the DHCP requests from the hosts connected to the LAN and the GPRS/UMTS protocols, and also routes traffic to/from those hosts. In an alternative embodiment, the MT uses PPP over Ethernet (PPPoE, rfc 2516) to connect to each TE with a physical LAN, while maintaining separate logical connections with each individual TE. The subsequent paragraphs describe both the DHCP embodiment and the PPPoE embodiment.

Embodiment 1: DHCP

Figure 2:
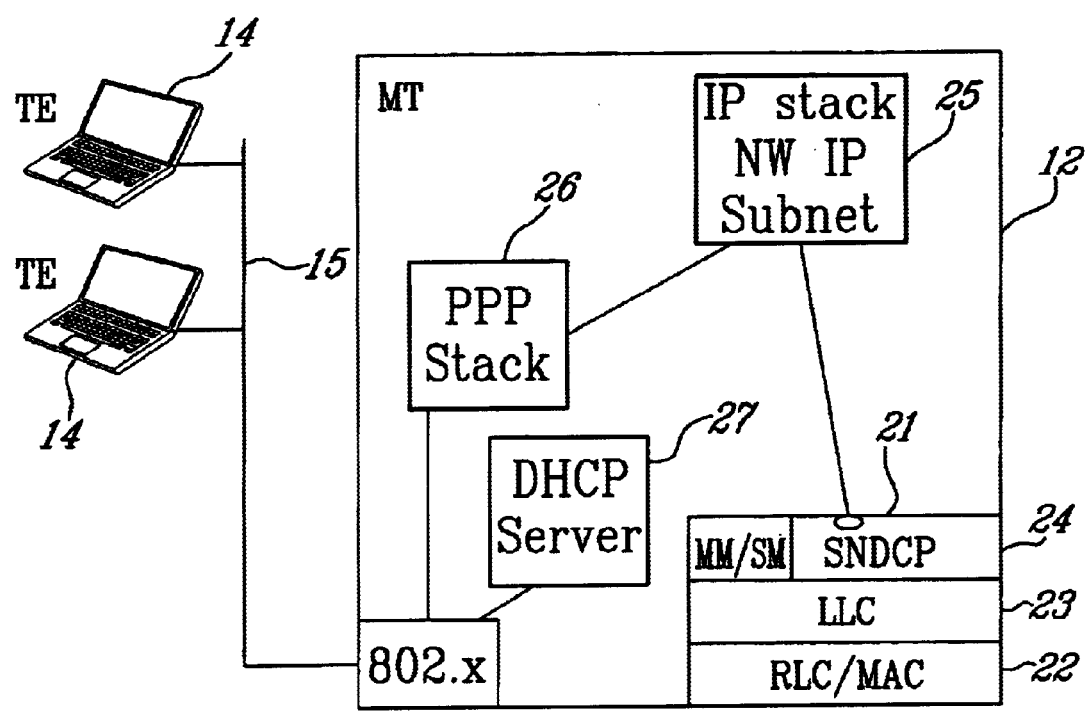
FIG. 2 is a simplified functional block diagram of a first embodiment of a mobile terminal in which a Dynamic Host Configuration Protocol (DHCP) server is utilized to interface a plurality of TEs with a packet data network.

FIG. 2 is a simplified functional block diagram of a first embodiment of a mobile terminal 12 in which a DHCP server is utilized to interface a plurality of TEs with a PDN. The MT includes a radio side protocol stack 21 comprising a Radio Link Control/Medium Access Control (RLC/MAC) protocol layer 22, a Logical Link Control (LLC) layer 23, and a Sub-Network Dependence Convergence Protocol (SNDCP) layer 24. Mobility Management/Service Management (MM/SM) is also performed at this layer. On top of the SNDCP layer is an IP stack 25 to which a network address comprising a plurality of individual IP addresses is passed from the PDN 18. The IP stack is linked to a PPP stack 26 which establishes a link between the TEs 14 and the MT 12. A DHCP server 27 is implemented to assign the multiple IP addresses included in the network address to the TE hosts and devices connected to the LAN 15. The PPP stack then provides the dynamic IP addresses to the TEs using 802.x.

Figure 3:
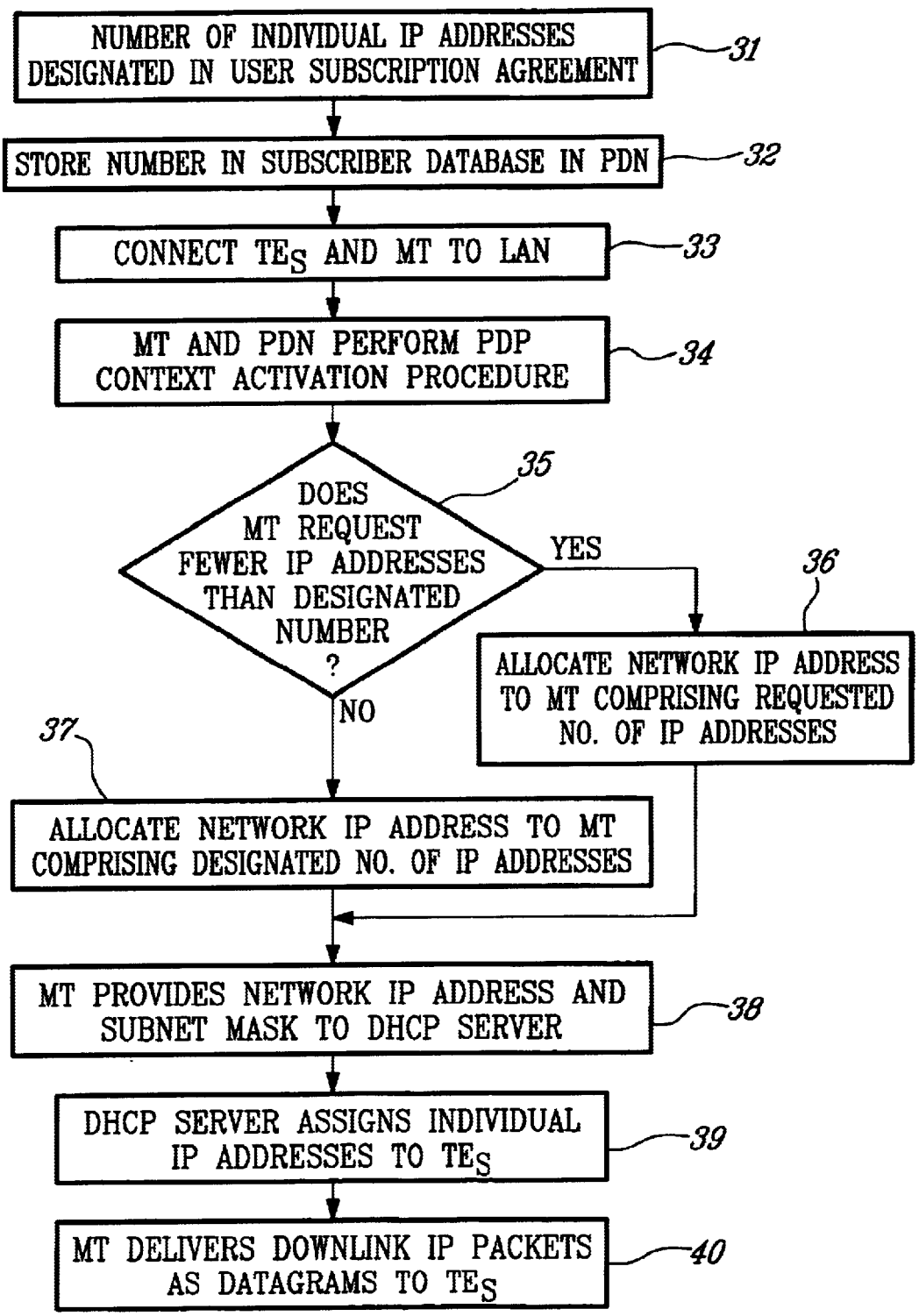
FIG. 3 is a flow chart illustrating the steps of the first embodiment of the method of the present invention.

FIG. 3 is a flow chart illustrating the steps of the first embodiment of the method of the present invention. The DHCP embodiment assumes that a user who desires to connect a plurality of devices to a PDN through a single wireless link has some kind of subscription or agreement with the network operator which designates the number of unique individual IP addresses that the user needs. This is indicated at step 31. At 32, the number of unique individual IP addresses for each subscriber is then stored in a subscriber database in the PDN. At 33, the TEs and the MT are then connected on a network such as a wired or wireless LAN. When the user connects to the IP network, instead of the network assigning a single IP address for a single device to the user device, the network performs a single PDP Context activation procedure at 34, but allocates a network address comprising the number of unique individual IP addresses designated in the subscription agreement. The network address is essentially a collection of single host addresses, and enables a number of devices to be addressed individually. When the IP protocol is used, this means assigning an address such as 10.1.1.0 with a subnet mask of 255.255.255.0 instead of an address such as 10.1.1.1 with a subnet mask of 255.255.255.255. When using the IP protocol, the network address may comprise 1, 2, 4, or 16, etc. single host addresses. The MT then takes the network address and divides it into a plurality of single addresses and distributes it to the separate devices on the LAN or wireless LAN.

Preferably, the invention provides public IP addresses rather than private IP addresses so that each device can be addressed from PDNs such as the Internet. If private IP addresses are supplied within the LAN, no help is required from the PDN. However, it is anticipated that it will become increasingly important, especially for multimedia types of applications, to be reachable from the PDN. It should be noted that while there is presently a concern regarding the availability of a sufficient number of IP addresses, many more IP addresses will be available when IPv6 is implemented.

Additional procedures may also be implemented to ensure that only the number of IP addresses actually needed are sent to the user's device. After the user accesses the IP network at 34, signaling with the network operator may be utilized to determine at step 35 whether the user needs fewer IP addresses or whether the user needs all of the IP addresses designated in the subscription agreement. If the user requests fewer IP addresses, the process moves to step 36 where the PDN allocates a network IP address to the MT comprising the requested number of individual IP addresses. If the user does not request fewer IP addresses, the process moves to step 37 where the PDN allocates a network IP address to the MT comprising the number of individual IP addresses designated in the subscription agreement. In GPRS or UMTS, this can be accomplished during the PDP Context procedure. The network IP address is assigned to a single PDP Context in the MT 12, and all traffic to/from the GPRS PDN core network 18 is treated as traffic to/from the MT (from the perspectives of authentication, authorization, access control, routing, and charging data).

At step 38, the MT provides the network IP address and the subnet mask to the DHCP server 27. At 39, the DHCP server assigns the unique individual IP addresses to each of the TEs connected to the LAN. Handling the uplink traffic in the MT is straight forward. For the downlink traffic, the MT receives the IP packets which include the proper final destination address for a particular TE on the LAN. On the LAN interface, the MT then uses normal Address Resolution Protocol (ARP) procedures at step 40 to deliver datagrams to the particular TE.

This solution requires minor changes to the existing GPRS/UMTS protocols in order to enable the PDN to return a network address. However, the solution can scale to a large number of hosts and devices, is simple for the PDN to implement, does not cost anything more from the PDN perspective, does not complicate routing, and, importantly, does not add overhead to the cellular link. It is then up to the user device to locally distribute the single IP addresses. Each device then has bi-directional IP connectivity.

Embodiment 2: PPPoE

Figure 4:
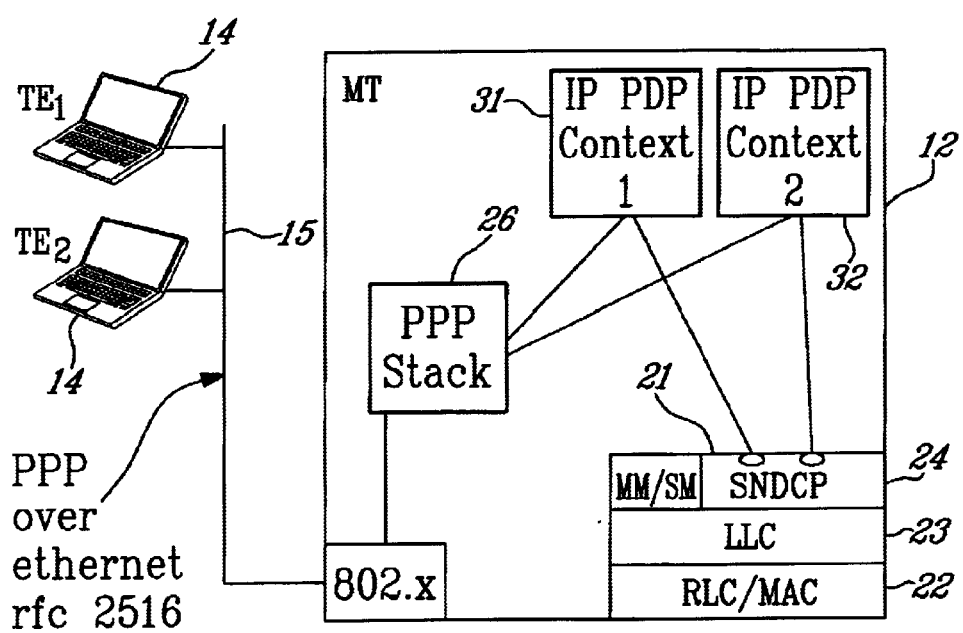
FIG. 4 is a simplified functional block diagram of a second embodiment of a mobile terminal in which PPP over Ethernet (PPPoE) is utilized to interface a plurality of TEs with a packet data network.

FIG. 4 is a simplified functional block diagram of a second embodiment of a mobile terminal 12 in which PPP over Ethernet (PPPoE) is utilized to interface a plurality of TEs with a PDN. As described above, the MT includes the radio side protocol stack 21 comprising the RLC/MAC protocol layer 22, the LLC layer 23, and the SNDCP layer 24. On top of the SNDCP layer, a plurality of PDP Contexts 45 and 46 are established: one for each TE 14 connected to the LAN 15. The PDP Contexts connect to the PPP stack 26 which establishes a link between the TE 14 and the MT 12 using 802.x.

Figure 5:
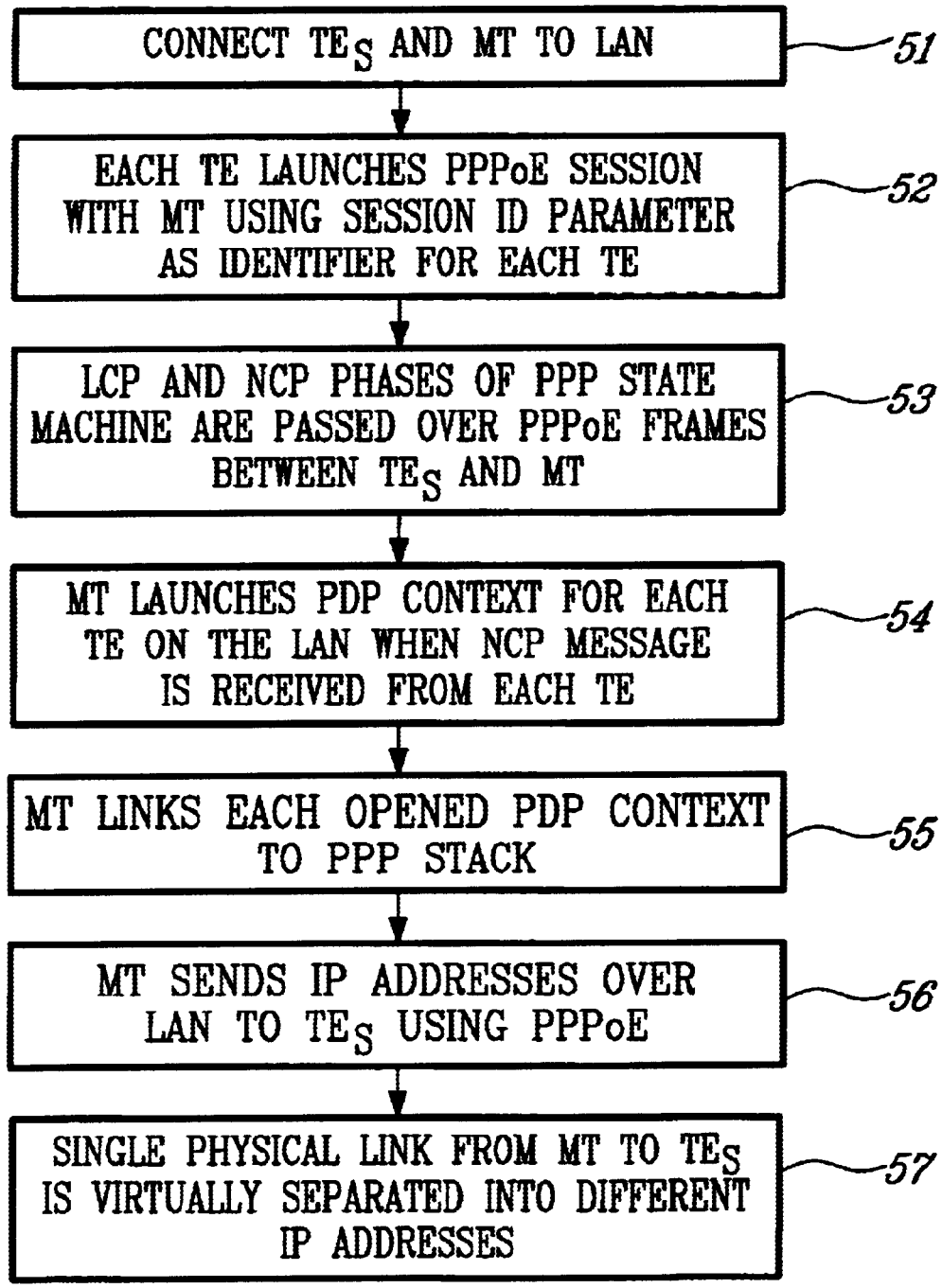
FIG. 5 is a flow chart illustrating the steps of the second embodiment of the method of the present invention.

FIG. 5 is a flow chart illustrating the steps of the second embodiment of the method of the present invention. Once again, at step 51, the TEs and the MT are connected on a network such as a wired or wireless LAN. At 52, each TE workstation on the LAN launches a PPP over Ethernet (PPPoE) session with the MT 12 as per rfc 2516. The session ID parameter defined in rfc 2516 is used as an identifier for each PPP host TE. At 53, the Link Control Protocol (LCP) and Network Control Protocol (NCP) phases of the PPP state machine are passed over PPPoE frames between the TEs and the MT. When the MT receives an NCP message from one of the TEs on the LAN at 54, the MT launches a PDP Context for that TE. Thus, for each TE device in the LAN 15 that requires an IP address, the MT uses the existing PDP Context facility, as currently defined in GPRS/UMTS, to request a separate PDP Context procedure from the PDN. At 55, separate links are then set up from each opened PDP Context to the PPP stack. At 56, the IP addresses are sent over the LAN to the TEs using the PPPoE protocol.

In GPRS, the PDP Context is intended to create a number of virtual links, all ending in the same terminal. The GPRS standard allows for up to 14 PDP Contexts to be opened at one time for use by the same device. There is a one-to-one relationship between the PDP Contexts and the TEs connected to the LAN. Therefore, the number of devices in the LAN is limited to 14.

Opening multiple PDP Contexts is a viable solution for connecting multiple TEs through the MT as long as there is only one physical link between the TEs and the MT, since it would be unrealistic to establish a separate link connection to each of the connected TEs. As shown at 57, on the LAN side there is still one physical link, but it is virtually separated into different IP addresses.

In this embodiment, the MT performs the key tasks of the method without requiring a lot of support from the PDN. This solution "costs" more on the PDN side since multiple PDP Contexts must be set up and maintained. However, the function of distributing the IP addresses to the different devices is performed by the MT, and there are no network standardization changes required.

It is thus believed that the operation and construction of the present invention will be apparent from the foregoing description. While the mobile terminal and method shown and described has been characterized as being preferred, it will be readily apparent that various changes and modifications could be made therein without departing from the scope of the invention as defined in the following claims.

What is claimed is:

1. A method of connecting a plurality of devices, each having a unique Internet Protocol (IP) address, through a single mobile terminal (MT) and a single wireless link to a packet data network (PDN), said method comprising the steps of:

connecting the plurality of devices and the MT on a network;

recording in a subscriber database associated with the PDN, how many unique individual IP addresses are to be included in the network IP address sent to the MT;

sending a network IP address from the PDN to the MT, the network IP address comprising a plurality of unique individual IP addresses; and distributing by the MT, the plurality of unique individual IP addresses to the plurality of devices on the network.

2. The method of connecting a plurality of devices through a single MT and a single wireless link to a PDN of claim 1 wherein the step of connecting the plurality of devices and the MT on a network includes connecting the plurality of devices and the MT on a local area network (LAN).

3. The method of connecting a plurality of devices through a single MT and a single wireless link to a PDN of claim 2 wherein the step of connecting the plurality of devices and the MT on a LAN includes connecting the plurality of devices and the MT on a wireless LAN.

4. The method of connecting a plurality of devices through a single MT and a single wireless link to a PDN of claim 1 wherein the step of sending a network IP address from the PDN to the MT includes the steps of:

performing, by the MT and the PDN, a packet data protocol (PDP) context activation procedure; and allocating by the PDN, the network IP address to the MT.

5. The method of connecting a plurality of devices through a single MT and a single wireless link to a PDN of claim 1 wherein the step of distributing by the MT, the plurality of unique individual IP addresses to the plurality of devices on the network includes the steps of:

providing the network P address and a subnet mask to a Dynamic Host Configuration Protocol (DHCP) server in the MT; and assigning by the DHCP server, the plurality of unique individual IP addresses to the plurality of devices on the network.

6. The method of connecting a plurality of devices through a single MT and a single wireless link to a PDN of claim 1 further comprising the steps of:

receiving IP packets in the MT that are addressed to one of the unique individual IP addresses; and delivering datagrams by the MT to a device on the network associated with the unique individual IP address received in the IP packets, said delivering step utilizing Address Resolution Protocol (ARP) procedures to deliver the datagrams.

7. A method of connecting a plurality of devices, through a single mobile terminal (MT) and a single wireless link to a packet data network (PDN), said method comprising the steps of:

connecting the plurality of devices and the MT on a network;

requesting by the MT, a separate packet data protocol (PDP) context for each device on the network; and utilizing a Point-to-Point Protocol over Ethernet (PPPoE) session between the devices on the network and the MT to virtually separate the physical network connection into a plurality of unique individual IP addresses assignable to the plurality of devices on the network.

8. The method of connecting a plurality of devices through a single MT and a single wireless link to a PDN of claim 7 wherein the step of connecting the plurality of devices and the MT on a network includes connecting the plurality of devices and the MT on a local area network (LAN).

9. The method of connecting a plurality of devices through a single MT and a single wireless link to a PDN of claim 8 wherein the step of connecting the plurality of devices and the MT on a LAN includes connecting the plurality of devices and the MT on a wireless LAN.

10. The method of connecting a plurality of devices through a single MT and a single wireless link to a PDN of claim 7 wherein the step of requesting by the MT, a separate packet data protocol (PDP) context for each device on the network includes the steps of:

launching a PPPoE session on the network between the MT and the plurality of devices;

receiving by the MT, an indication from an individual device on the network that the device requires an IP address; and requesting by the MT, a separate PDP context for each individual device on the network that requires an IP address.

11. The method of connecting a plurality of devices through a single MT and a single wireless link to a PDN of claim 7 further comprising linking each separate PDP context to a PPP protocol stack in the MT.

12. The method of connecting a plurality of devices through a single MT and a single wireless link to a PDN of claim 11 further comprising sending by the MT, a unique individual IP address to each device on the network using the PPPoE protocol.

13. A mobile terminal (MT) for connecting a plurality of devices on a local area network (LAN) through a single wireless link to a packet data network (PDN), said MT comprising:

means for requesting from the PDN, a separate packet data protocol (PDP) context for each device on the LAN; and a Point-to-Point Protocol over Ethernet (PPPoE) stack comprising:

means for connecting the MT to the plurality of devices on the LAN;

means for receiving an indication from each individual device on the LAN whether the device requires an Internet Protocol (IP) address; and means for distributing IP addresses to the plurality of devices on the LAN.

* * * * *